(12) United States Patent
Dietz et al.

(10) Patent No.: US 7,895,013 B2
(45) Date of Patent: Feb. 22, 2011

(54) ESTIMATION OF THE SPEED OF A MOBILE DEVICE

(75) Inventors: David Blaine Dietz, Waterloo (CA); Nagula Tharma Sangary, Waterloo (CA); Sean Bartholomew Simmons, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/050,351

(22) Filed: Mar. 18, 2008

(65) Prior Publication Data

US 2009/0240464 A1 Sep. 24, 2009

(51) Int. Cl.
*G01P 5/00* (2006.01)
(52) U.S. Cl. .................................................. 702/142
(58) Field of Classification Search ............... 702/75, 702/96, 142, 182, 189
See application file for complete search history.

(56) References Cited

U.S. PATENT DOCUMENTS

| | | | |
|---|---|---|---|
| 6,311,078 B1 | 10/2001 | Hardouin | |
| 6,502,022 B1 | 12/2002 | Chastain et al. | |
| 6,600,975 B2 | 7/2003 | Moriguchi et al. | |
| 6,687,497 B1 | 2/2004 | Parvulescu et al. | |
| 7,236,776 B2 | 6/2007 | Nath et al. | |
| 2002/0151297 A1 | 10/2002 | Remboski et al. | |
| 2004/0127198 A1 | 7/2004 | Roskind et al. | |
| 2004/0198306 A1 | 10/2004 | Singh et al. | |
| 2004/0209594 A1 | 10/2004 | Naboulsi | |
| 2005/0255874 A1 | 11/2005 | Stewart-Baxter et al. | |
| 2005/0288024 A1 | 12/2005 | Song | |
| 2006/0258294 A1 | 11/2006 | Juncker et al. | |
| 2007/0010943 A1 | 1/2007 | Pair et al. | |
| 2007/0026850 A1 | 2/2007 | Keohane et al. | |
| 2007/0072553 A1 | 3/2007 | Barbera | |
| 2007/0173234 A1 | 7/2007 | Deprun | |
| 2008/0014881 A1 * | 1/2008 | Engdahl et al. | 455/187.1 |

FOREIGN PATENT DOCUMENTS

| | | |
|---|---|---|
| JP | 3110933 | 5/1991 |
| WO | 2004019646 A1 | 3/2004 |
| WO | 2008006649 A1 | 1/2008 |

OTHER PUBLICATIONS

Nokia Corporation; "Advanced Car Kit CK-7W User Guide Installation Guide"; Copyright 2007; 23 pgs.
Chittaro, Luca et al.; "Driver Distraction Caused by Mobile Devices: Studying and Reducing Safety Risks"; University of Udine, Udine, Italy; Apr. 2004; 19 pgs.
Williams, John; "Cell Phones and Driivng"; Minnesota House of Representatives, Research Department; Oct. 2002; 8 pgs.
EP Extended Search and Examination Report; EP Application No. 08153671.6; Jul. 11, 2008; 5 pgs.
European Search and Examination Report; EP Application No. 08152414.2; Aug. 14, 2008; 7 pgs.

* cited by examiner

*Primary Examiner* — Drew A Dunn
*Assistant Examiner* — Stephen J Cherry

(57) ABSTRACT

A mobile device configured to estimate the speed at which it is moving. The mobile device includes a timing component configured to perform a plurality of Doppler shift measurements on a timing signal received by the mobile device. The mobile device also includes a processing component configured to correlate the size of the range of the plurality of Doppler shift measurements to the speed at which the mobile device is moving.

17 Claims, 6 Drawing Sheets

ESTIMATION OF THE SPEED OF A MOBILE DEVICE

CROSS-REFERENCE TO RELATED APPLICATIONS

The present application is related to U.S. patent application Ser. No. 12/043,495, filed Mar. 6, 2008, by David Blaine Dietz, et al, entitled "Safety for Mobile Device Users while Driving", which is incorporated by reference herein as if reproduced in its entirety.

BACKGROUND

Easily transportable devices with wireless telecommunications capabilities, such as mobile telephones, personal digital assistants, handheld computers, and similar devices, will be referred to herein as mobile devices. A communications connection between a mobile device and another component might promote a voice call, a text-based message, a file transfer, or some other type of data exchange, any of which can be referred to as a call, a session, or a message.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
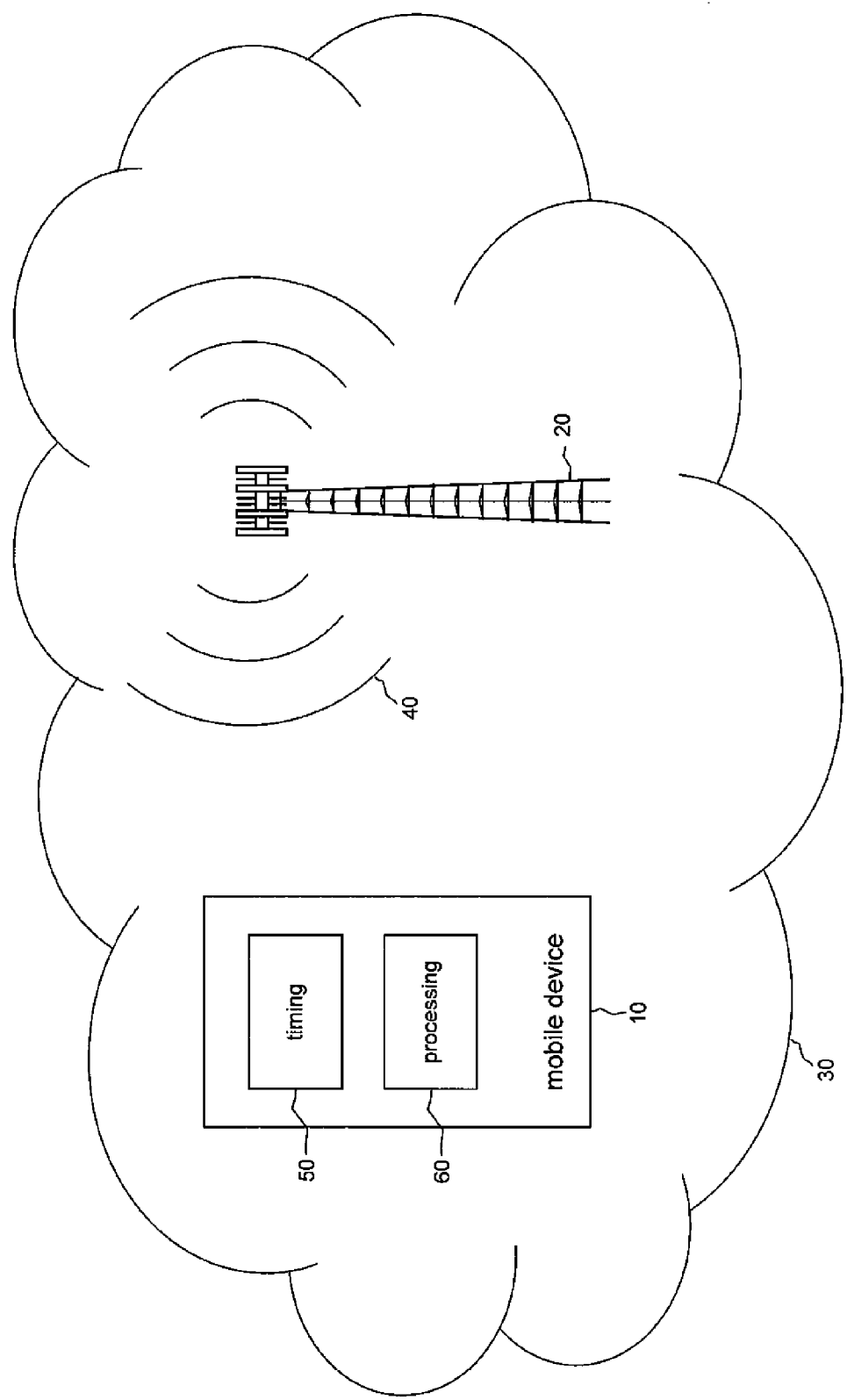
FIG. 1 is a block diagram of a telecommunications system according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a mobile device is provided that is configured to estimate the speed at which it is moving. The mobile device includes a timing component configured to perform a plurality of Doppler shift measurements on a timing signal received by the mobile device. The mobile device also includes a processing component configured to correlate the size of the range of the Doppler shift measurements to the speed at which the mobile device is moving.

In another embodiment, a method for estimating the speed of a mobile device is provided. The method includes determining the size of a range of a plurality of Doppler shift measurements made by the mobile device and using the size of the range of the Doppler shift measurements to analyze the speed of the mobile device.

Concerns have arisen over the use of mobile devices in moving vehicles. In particular, it has been speculated that drivers using mobile devices might become distracted from vehicle operation and might therefore be more prone to accidents than other drivers. One way of addressing these concerns is by disabling the devices or certain functions of the devices when the devices are in motion. For example, the speed at which a mobile device is moving might be determined by techniques described herein. When the speed of a mobile device is determined to be above a threshold, an assumption can be made that the device is in a moving vehicle. The device's user interface might then be disabled, the mobile device's transmitting and/or receiving capabilities might be disabled, or other restrictions might be placed on one or more of the device's functions.

Several techniques have been defined for determining the speed at which a mobile device is moving. Many of these techniques, such as using global positioning system (GPS) readings, triangulation, or the number of handoffs of a call between base stations, rely on the use of one or more network elements for the speed determination. For example, the use of GPS might entail the mobile device sending a network element information about the device's location at two or more different times. The network element might then calculate an average speed of the device by dividing the distance traveled by the time needed to travel that distance. The network element might then return this calculated speed to the mobile device for use by the mobile device.

In addition, several techniques may exist for determining a mobile device's speed that may not rely on any data processing by a network element. For example, one technique may involve the use of a received signal strength indication (RSSI), wherein a mobile device calculates its speed based on the strength of the signals it receives. However, the RSSI technique can consume a great deal of the mobile device's processing capacity and may not work reliably in complex environments, such as urban settings.

In an embodiment, the speed at which a mobile device is moving is reliably estimated by the device itself, without any processing or other burden on the network and without excessive processing by the mobile device. More specifically, the width or spread of a frequency error distribution of the Doppler shifts of a radio signal that the mobile device receives from a network element is used to indicate the speed of the mobile device. Since all of the processing to estimate the speed is performed by the mobile device, the processing resources of the network element can be conserved. In addition, the estimation of the speed might occur faster in this embodiment since there is no need for the mobile device to send data to the network element, wait for the network element to process the data, and then wait to receive a calculated result from the network element.

FIG. 1 illustrates an embodiment of a mobile device 10 that might provide the functionality described herein. The mobile device 10 can receive radio frequency signals from a network element 20, such as a base station or an enhanced node B. The mobile device 10 and the network element 20 are components in a wireless telecommunications network 30, such as a code division multiple access (CDMA) network, a wideband CDMA (WCDMA) network, a Global System for Mobile communication/Enhanced Data rates for Global Evolution (GSM/EDGE) network, or some other known or future network. It is well known in the art that the network element 20 can transmit a timing signal 40 that the mobile device 10 can use to compensate for Doppler effects and keep the mobile device 10 synchronized with the network 30. One of skill in the art will recognize that the timing signal 40 might be known by different names under different network technologies. The term "timing signal" will be used generically herein to denote any signal used for synchronization between the mobile device 10 and the network 30, regardless of the technology used by the network 30.

Mobile devices typically include a timing component 50, such as an Automatic Frequency Control (AFC) system, that can receive information contained in the timing signal 40. The timing component 50 can use the timing signal information to compensate for Doppler effects that could cause a loss of synchronization between the mobile device 10 and the network 30. The timing component 50 might include a voltage controlled temperature compensated crystal oscillator (VCTCXO) or a similar element that can produce a relatively stable radio frequency output. The timing component 50 can compare this internally produced signal to the timing signal 40 to determine the amount of Doppler shift experienced by a moving mobile device 10.

However, factors such as multi-path interference, fading effects due to environmental change, and variability between base station line of sight and direction of travel of the mobile device 10 can cause difficulties in measuring the exact Doppler shift as experienced by the mobile device 10 at a given time. Even when the mobile device 10 is stationary, the inherent limits of accuracy of the timing component 50 could cause multiple different results to be obtained when multiple measurements are made of the Doppler shift experienced by the mobile device 10. The accuracy limits of the timing component 50 could be due to noise in the timing component 50, short-term temperature drift, the resolution limits of the processing components in the timing component 50 and/or in the mobile device 10, and other factors. When the accuracy limits of the timing component 50, multi-path interference, or other factors cause different results for different Doppler shift measurements, the range of results can be referred to as a frequency error distribution of the measurements.

When the mobile device 10 is in motion, the above factors could cause an even greater frequency error distribution in the measurements of the Doppler shift. Thus, the width or spread of the frequency error distribution for a set of Doppler shift measurements for the mobile device 10 can vary depending on the motion of the mobile device 10. If the mobile device 10 is stationary or is moving at a relatively slow speed, the frequency error distribution will typically be relatively narrow. If the mobile device 10 is moving at a relatively high speed, the frequency error distribution will typically be relatively wide.

Figure 2:
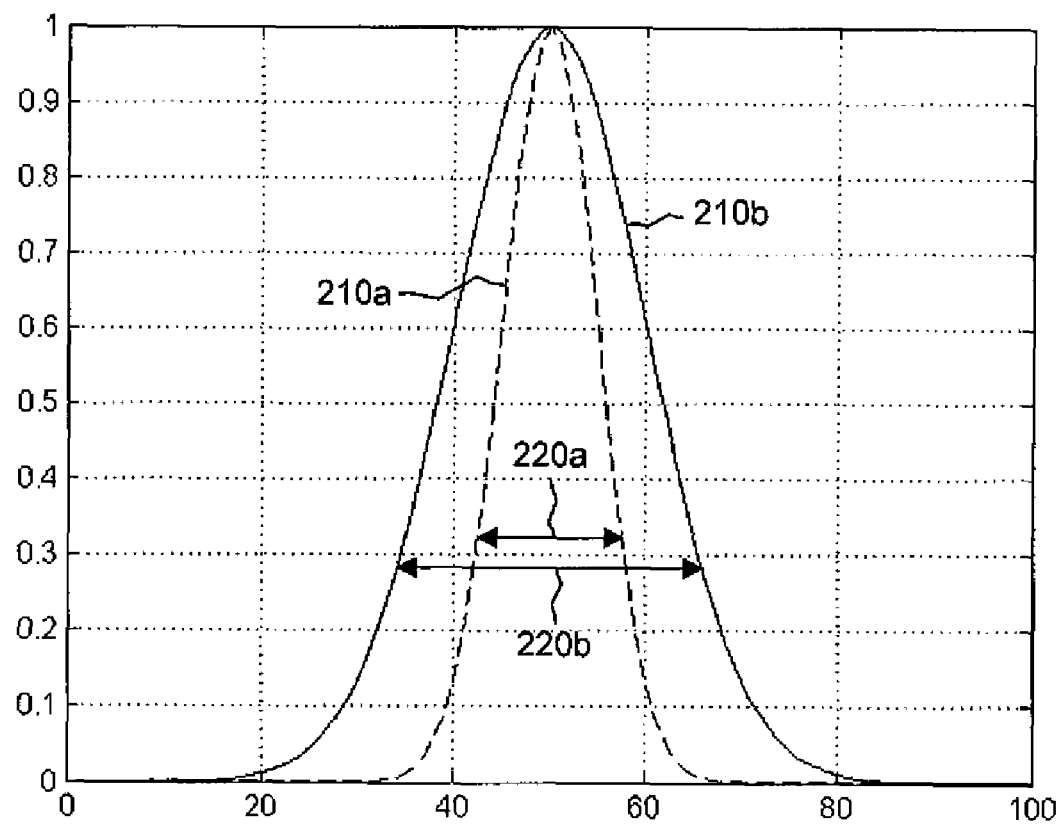
FIG. 2 is a diagram of two ranges of frequency offsets according to an embodiment of the disclosure.

As illustrated in FIG. 2, two curves depict the frequency error distribution for Doppler shift measurements made by the mobile device 10 in two different circumstances. The graph of FIG. 2 is an idealized representation of two frequency error distributions, and the scales of the horizontal and vertical axes should not be construed as representing actual values related to Doppler shift measurements. A first frequency error distribution 210a, represented by a dashed curve, applies to a case where the mobile device 10 is stationary or is being carried by a pedestrian. It can be seen that the width 220a of the frequency error distribution 210a is relatively narrow. That is, the results of multiple measurements of the Doppler shift experienced by the mobile device 10 fall in a narrow range, the size of which might be related to the inherent limits of accuracy of the timing component 50. By contrast, a second frequency error distribution 210b, represented by a solid curve, applies to a case where the mobile device 10 is in a vehicle moving at a higher speed. In this case, the frequency error distribution 210b has a relatively broad width 220b, possibly due to multi-path interference, fading effects due to environmental change, variability between base station line of sight and direction of travel of the mobile device 10, or similar factors.

In an embodiment, the width 220 of the frequency error distribution 210 for a plurality of measurements of the Doppler shift experienced by the mobile device 10 is used to indicate the speed at which the mobile device 10 is moving. When the frequency error distribution 210 is relatively narrow, it can be assumed that the mobile device 10 is stationary or moving at a relatively slow speed. When the frequency error distribution 210 is relatively wide, it can be assumed that the mobile device 10 is moving at a higher speed. It should be understood that creation of a graph as shown in FIG. 2 and measurement of the width of the graph are not necessary to perform a speed estimation in this manner. A frequency error distribution for a set of Doppler shift measurements could be modeled mathematically and the size of the distribution could be determined without the need for a graphical representation.

In an embodiment, frequency error distribution widths 220 can be defined that correspond to particular speeds or ranges of speeds. If the frequency error distribution width 220 is less than a particular narrow width, width 220a for example, it can be assumed that a mobile device is stationary or moving slowly. If the frequency error distribution width 220 is greater than a greater width, width 220b for example, it can be assumed that a mobile device is moving faster. For a frequency error distribution width 220 between width 220a and 220b, the speed of a mobile device might be indeterminate. Even if a particular frequency error distribution width 220 cannot be precisely correlated to a specific speed, a frequency error distribution width 220 might be defined in such a way that a high degree of confidence can be held that a frequency error distribution 210 with that or a greater width indicates that the mobile device is moving at a speed above a particular threshold. The more measurements that are used to create the frequency error distribution 210, the more accurate the speed estimation might be.

By estimating its speed through determining the size of the range of a plurality of Doppler shift measurements, the mobile device can conserve processing capacity that the mobile device 10 and/or network 30 might otherwise use. The mobile device 10 can use measurements that it takes for the purpose of synchronization with the network 30 for the alternative purpose of estimating its speed. No processing by the network 30 is needed, and the only additional processing that the mobile device 10 might perform is determining whether the frequency error distribution width 220 is greater than the size that corresponds to the threshold speed. In some embodiments, the timing component 50 might compare the range of its Doppler shift measurements to a predefined size and, based on the comparison, determine the approximate speed of the mobile device 10. In alternative embodiments, the timing component 50 might pass its Doppler shift measurements to a processing component 60 on the mobile device 10. The processing component 60 might then compare the range of the measurements to the predefined size and use the comparison to estimate the speed of the mobile device 10.

In some embodiments, the mobile device 10 might also perform a speed measurement using one or more of the traditional techniques mentioned above. The mobile device 10 might then compare this speed measurement with a speed estimated by the techniques described herein. The comparison might be used to calibrate the techniques described herein, to enable the techniques described herein to refine their speed estimates, or for other purposes.

Figure 3:
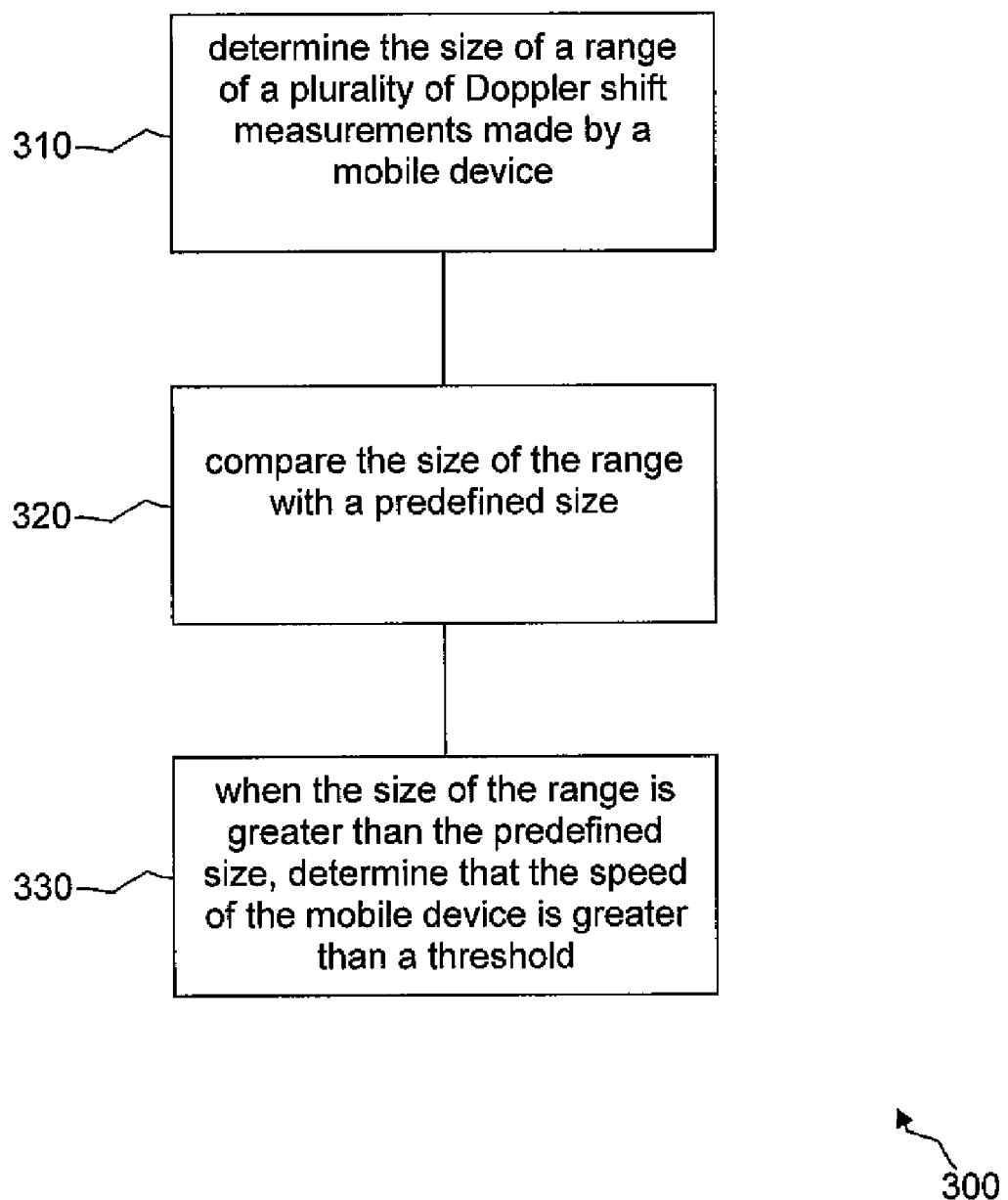
FIG. 3 is a diagram of a method for estimating the speed of a mobile device according to an embodiment of the disclosure.

FIG. 3 illustrates an embodiment of a method 300 for estimating the speed at which a mobile device is moving. At block 310, the size of the range of a plurality of Doppler shift measurements made by the mobile device is determined. At block 320, a comparison is made between the size of the range and a predefined size. At block 330, when the size of the range is greater than the predefined size, a determination is made that the speed of the mobile device is greater than a threshold.

When a mobile device, using the techniques described herein, determines that it is moving at speed above a predefined threshold, the mobile device might activate a safety feature that places restrictions on one or more functions of the mobile device. In various embodiments, the radio functions of the mobile device remain in effect when the safety feature is activated so that the device can still receive messages, but restrictions are placed on various other capabilities of the device. In some embodiments, restrictions might be placed on a capability of the device to provide information on an output interface of the device. For example, the device might receive text messages, but the display of incoming text messages on the device might be disabled. In some cases, an audible, visible, tactile, or other indication that a text message has been received might be provided even though the text message itself cannot be seen. In another example, the device might receive voice messages, but a ring tone or other indicator of an incoming voice call might be disabled. In some cases, an audible, visible, tactile, or other indication to which the device user cannot respond might be provided to indicate that a voice call has been received.

In alternative or additional embodiments, restrictions might be placed on a capability of the device to respond to certain inputs on an input interface of the device. For example, the capability of the device to respond to one or more inputs into the device's keypad might be disabled. This could prevent a user from retrieving or generating text or voice messages while the safety feature is activated. In some cases, the input restrictions on the device prevent the user from entering text or otherwise responding to incoming text messages even though the incoming text messages are displayed. In another example, the capability of the device to respond to inputs into the device's microphone might be disabled. This could prevent a user from providing voice commands while the safety feature is activated.

There are situations in which placing restrictions on one or more of a mobile device's functions when the device is in motion may not be appropriate. For example, if it is determined that the mobile device of a passenger in an automobile being driven by another person is in motion, the passenger's mobile device might be disabled. Since the passenger is not involved in the operation of the vehicle, the passenger's use of the mobile device may not pose a safety risk, and there may be no need to disable the passenger's mobile device or functions on the device. Similarly, it may be inappropriate to disable the mobile devices of passengers on public transportation vehicles such as buses, trains, and airplanes.

In an embodiment, when a determination is made that a mobile device is in motion above a threshold speed, a user interface on the device can notify the user of the device that a safety feature disabling the device or one or more functions of the device is about to be activated. The user can then be given an opportunity to prevent the safety feature from being activated and allow the mobile device to continue normal operation. The interface that notifies the user of the impending disablement of the mobile device might be a text-based message that appears on the display screen of the device, an automated voice message spoken by the device, an audible, visible, and/or tactile alarm signal, or some other type of output.

Upon receiving this notification, the user can provide an input into the mobile device to prevent the activation of the safety feature. For example, a driver who is willing to accept the safety risk of sending and receiving messages while driving may provide an input to override the safety feature. Alternatively, a driver who is not willing to accept such a risk might choose not to override the safety feature. Alternatively, a passenger in an automobile being driven by another person or in a public transportation vehicle may not be an appropriate target for the safety feature and may choose to prevent the activation of the safety feature. A mobile device would continue its normal operation in such cases, and none of its functions would be disabled. The input might be a press of a button on the mobile device's keypad, a touch of an area on a touch-sensitive screen on the device, a voice command spoken into the device, or some other type of input.

In an embodiment, after the mobile device provides the notification of the impending activation of the safety feature, the user may have a limited amount of time in which to prevent the activation. If the user provides an input to override the safety feature within this time period, the safety feature is not activated and the device acts in its usual manner. If the user does not override the safety feature within the time period, the safety feature is activated and restrictions are placed on the capabilities of the mobile device. The device may give the user the capability to specify the length of the time period in which activation of the safety feature can be prevented. The device may also give the user the capability to specify a key or keystroke sequence that can be used to prevent activation of the safety feature.

In an alternative embodiment, the mobile device might simply provide a notification that the device is moving at a speed greater than the threshold. The user may then take an action to activate the safety feature or may take no action and leave the safety feature inactivated.

Figure 4:
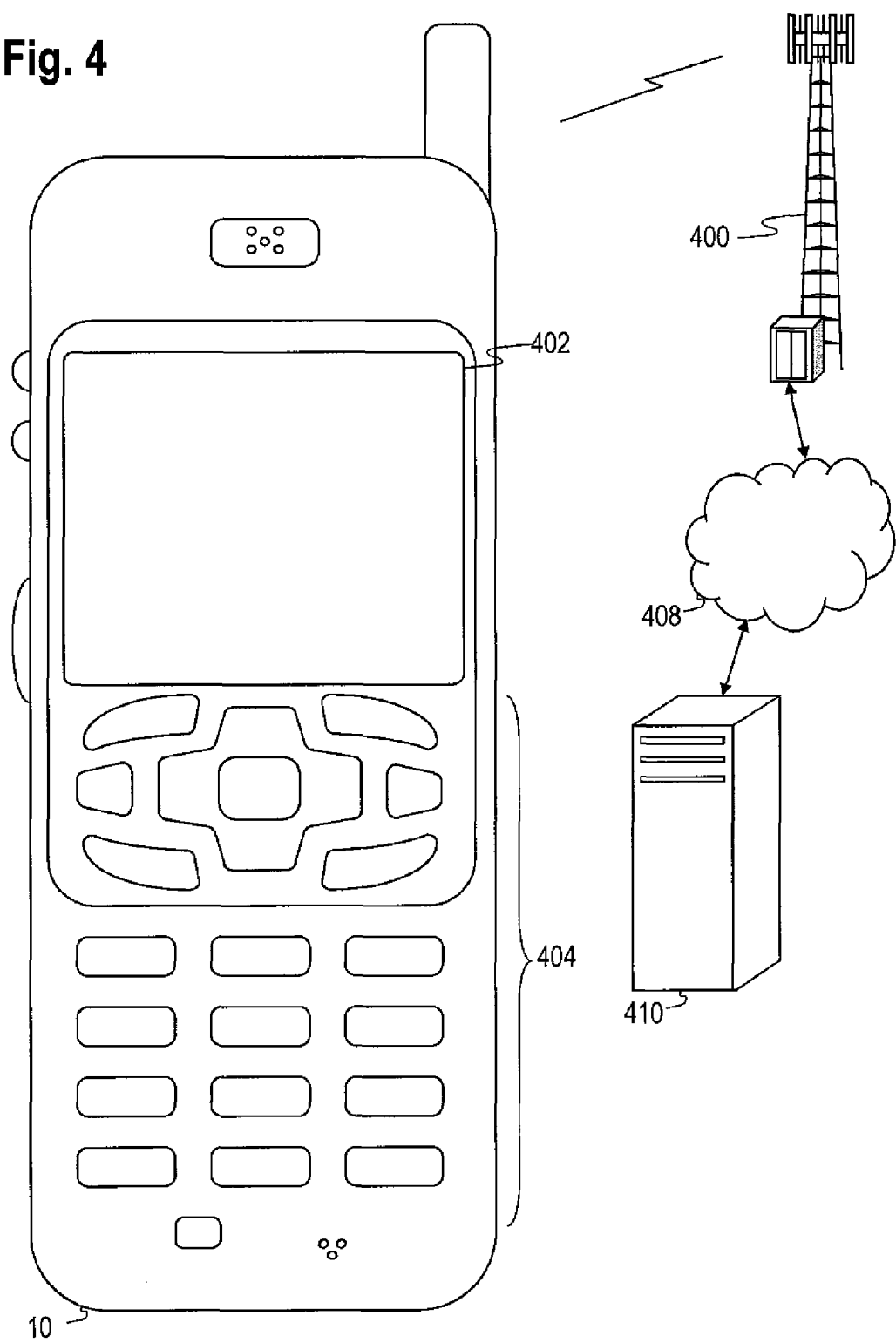
FIG. 4 is a diagram of a wireless communications system including a mobile device operable for some of the various embodiments of the disclosure.

FIG. 4 illustrates a wireless communications system including an embodiment of the mobile device 10. The mobile device 10 is operable for implementing aspects of the disclosure, but the disclosure should not be limited to these implementations. Though illustrated as a mobile phone, the mobile device 10 may take various forms including a wireless handset, a pager, a personal digital assistant (PDA), a personal entertainment device, a portable computer, a tablet computer, or a laptop computer. Many suitable devices combine some or all of these functions. In some embodiments of the disclosure, the mobile device 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the mobile device 10 may be a portable, laptop or other computing device. The mobile device 10 may support specialized activities such as gaming, inventory control, job control, and/or task management functions, and so on.

The mobile device 10 includes a display 402. The mobile device 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Alternatively, the input keys might be touch-sensitive areas within the display 402. The mobile device 10 may present options for the user to select, controls for the user to actuate, and/or cursors or other indicators for the user to direct.

The mobile device 10 may further accept data entry from the user, including numbers to dial or various parameter values for configuring the operation of the mobile device 10. The mobile device 10 may further execute one or more software or firmware applications in response to user commands. These applications may configure the mobile device 10 to perform various customized functions in response to user interaction. Additionally, the mobile device 10 may be programmed and/or configured over-the-air, for example from a wireless base station, a wireless access point, or a peer mobile device 10.

Among the various applications executable by the mobile device 10 are a web browser, which enables the display 402 to show a web page. The web page may be obtained via wireless communications with a wireless network access node, a cell tower, a peer mobile device 10, or any other wireless communication network or system 400. The network 400 may be equivalent to the network 30 of FIG. 1 and may include the network element 20 of FIG. 1. The network 400 is coupled to a wired network 408, such as the Internet. Via the wireless link and the wired network, the mobile device 10 has access to information on various servers, such as a server 410. The server 410 may provide content that may be shown on the display 402. Alternately, the mobile device 10 may access the network 400 through a peer mobile device 10 acting as an intermediary, in a relay type or hop type of connection.

Figure 5:
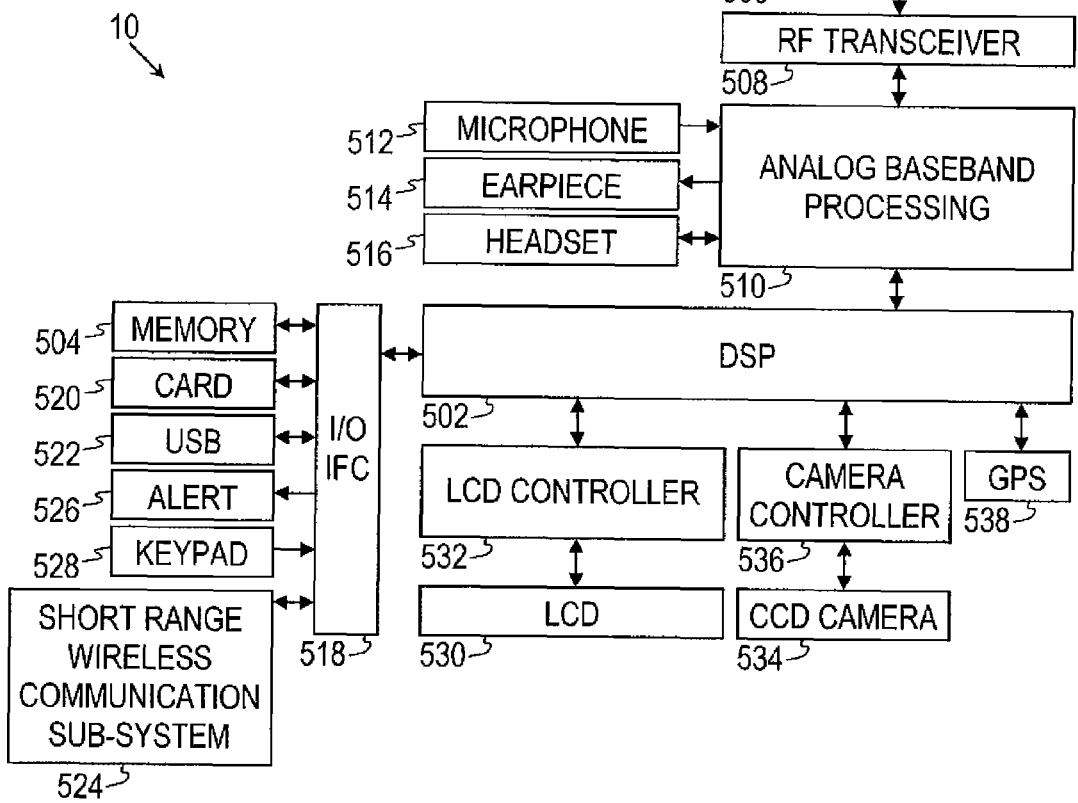
FIG. 5 is a block diagram of a mobile device operable for some of the various embodiments of the disclosure.

FIG. 5 shows a block diagram of the mobile device 10. While a variety of known components of mobile devices 10 are depicted, in an embodiment a subset of the listed components and/or additional components not listed may be included in the mobile device 10. The mobile device 10 includes a digital signal processor (DSP) 502 and a memory 504. As shown, the mobile device 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD) or other display, which may include a touch sensitive surface 530, an LCD controller 532, a charge-coupled device (CCD) camera 534, a camera controller 536, and a global positioning system (GPS) sensor 538. In an embodiment, the mobile device 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 10 to send and receive information from a cellular network or some other available wireless communications network or from a peer mobile device 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the mobile device 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the mobile device 10 and may also enable the mobile device 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the mobile device 10 to communicate wirelessly with other nearby mobile devices and/or wireless base stations.

The input/output interface 518 may further connect the DSP 502 to the alert 526 that, when triggered, causes the mobile device 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the mobile device 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the mobile device 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the mobile device 10 to determine its position. Various other peripherals may also be included to provide additional functions, e.g., radio and television reception.

Figure 6:
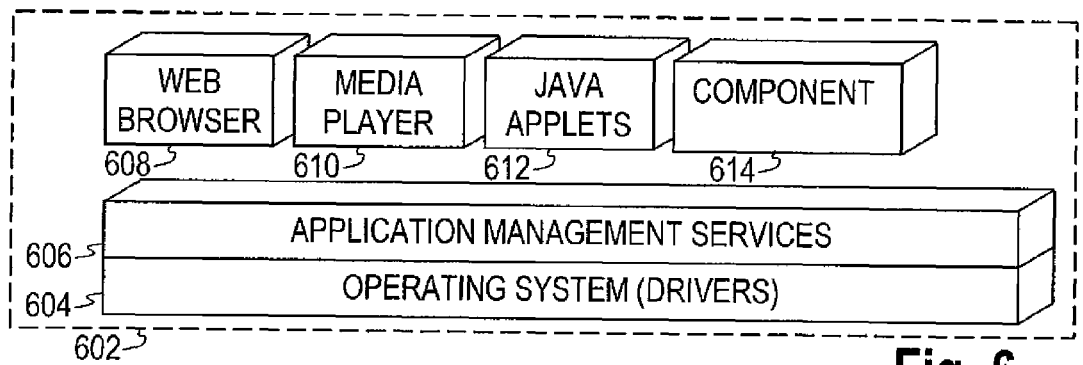
FIG. 6 is a diagram of a software environment that may be implemented on a mobile device operable for some of the various embodiments of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the mobile device 10. Also shown in FIG. 6 are a web browser application 608, a media player application 610, and Java applets 612. The web browser application 608 configures the mobile device 10 to operate as a web browser, allowing a user to enter information into forms and select links to retrieve and view web pages. The media player application 610 configures the mobile device 10 to retrieve and play audio or audiovisual media. The Java applets 612 configure the mobile device 10 to provide games, utilities, and other functionality. One or more components 614 might provide functionality related to the determination of the speed of the mobile device 10.

Figure 7:
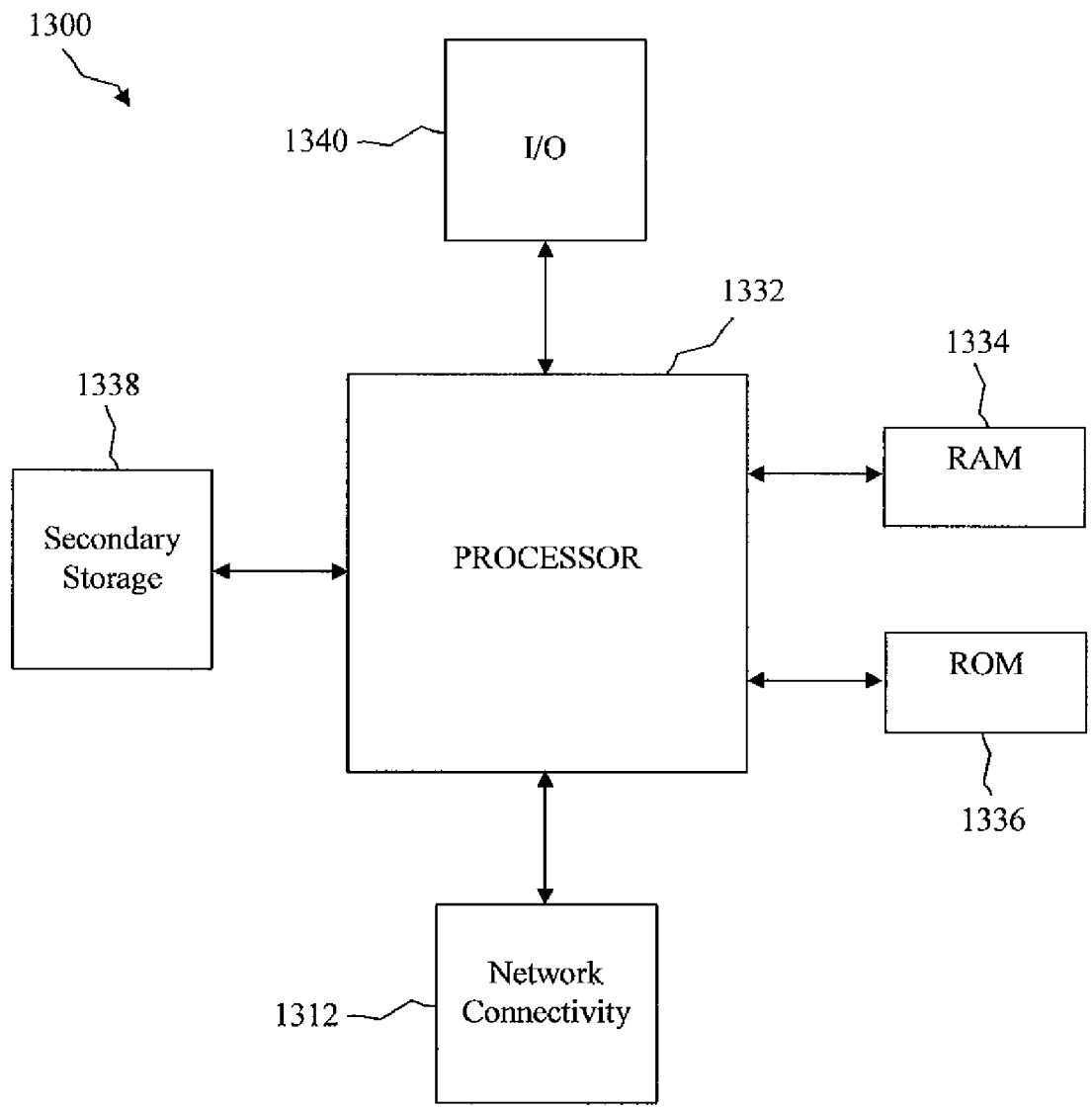
FIG. 7 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs which are loaded into RAM 1334 when such programs are selected for execution. The ROM 1336 is used to store instructions and perhaps data which are read during program execution. ROM 1336 is a non-volatile memory device which typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with an Internet or one or more intranets. With such a network connection, it is contemplated that the processor 1332 might receive information from the network, or might output information to the network in the course of performing the above-described method steps. Such information, which is often represented as a sequence of instructions to be executed using the processor 1332, may be received from and outputted to the network, for example, in the form of a computer data signal embodied in a carrier wave. The network connectivity devices 1312 may also include one or more transmitter and receivers for wirelessly or otherwise transmitting and receiving signal as are well know to one of ordinary skill in the art.

Such information, which may include data or instructions to be executed using the processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, scripts which it accesses from hard disk, floppy disk, optical disk (these various disk based systems may all be considered secondary storage 1338), ROM 1336, RAM 1334, or the network connectivity devices 1312. While only one processor 1332 is shown, multiple processors may be present. Thus, while instructions may be discussed as executed by a processor, the instructions may be executed simultaneously, serially, or otherwise executed by one or multiple processors. The processor 1332 may be substantially equivalent to the processing component 60 of FIG. 1.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile device comprising:
   a component configured to perform a plurality of Doppler shift measurements made at different times on a signal received by the mobile device;
   a processor configured to correlate a size of a range of the plurality of Doppler shift measurements to estimate a speed at which the mobile device is moving
   wherein the size of the range is a difference between a highest magnitude Doppler shift measurement and a lowest magnitude Doppler shift measurement of the plurality of Doppler shift measurements.

2. The mobile device of claim 1, wherein the processor correlates the size of the range of the plurality of Doppler shift measurements to the speed at which the mobile device is moving by comparing the size of the range to a predefined size and, when the size of the range is greater than the predefined size, determining that the speed at which the mobile device is moving is greater than a threshold.

3. The mobile device of claim 1, wherein the component is an automatic frequency control system.

4. The mobile device of claim 1, wherein the component and the processor are one of separate components; and portions of a single component.

5. The mobile device of claim 2, wherein, when the speed at which the mobile device is moving is greater than the threshold, an output component on the mobile device provides a notification of an impending disablement of at least one function of the mobile device, and an input component promotes controlling whether to disable the at least one function.

6. The mobile device of claim 5, wherein the output component is at least one of a text-based message, a voice-based message, an audible alarm, a visible alarm, and a tactile alarm.

7. The mobile device of claim 5, wherein the input component is at least one of a pressable button, a touch-sensitive area, and a voice command receptor.

8. The mobile device of claim 5, wherein, when the input component does not receive an appropriate input within a specified time period, the at least one function is disabled.

9. A method comprising:
   determining, by a mobile device, a size of a range of a plurality of Doppler shift measurements made by the mobile device at different times;
   analyzing, by the mobile device, a speed of the mobile device by using the size of the range of the Doppler shift measurements;
   wherein the size of the range is a difference between a highest magnitude Doppler shift measurement and a lowest magnitude Doppler shift measurement of the plurality of Doppler shift measurements.

10. The method of claim 9, further comprising when the size of the range of the Doppler shift measurements is greater than a predefined size, determining that the speed of the mobile device is greater than a threshold.

11. The method of claim 9, further comprising:
   when the speed of the mobile device exceeds a threshold, providing a notification on the mobile device related to activating a safety feature; and
   controlling whether to activate the safety feature.

12. The method of claim 11, further comprising activating the safety feature when the mobile device does not receive a timely override input that prevents the activation.

13. The method of claim 11, wherein the safety feature is at least one of a disablement of a user interface on the mobile device, a disablement of a text-based message sending capability of the mobile device, and a disablement of a voice-based message sending capability of the mobile device.

14. The mobile device of claim 1, wherein the signal comprises a timing signal.

15. The method of claim 9, wherein the signal comprises a timing signal.

16. A mobile device comprising:
   a component configured to perform a plurality of frequency measurements at different times on a signal received by a mobile device;
   a processor configured to determine a distribution of the frequency measurements and correlate a size of a range of the distribution of the frequency measurements to estimate a speed at which the mobile device is moving;

wherein the size of the range is a difference between a highest magnitude frequency measurement and a lowest magnitude frequency measurement of the plurality of frequency measurements.

17. A mobile device comprising:

a component configured to perform a plurality of Doppler shift measurements at different times on a signal received by a mobile device;

a processor configured to correlate a size of a range of a frequency error distribution of the plurality of Doppler shift measurements to estimate a speed at which the mobile device is moving, wherein the size of the range is a difference between a highest magnitude Doppler shift measurement and a lowest magnitude Doppler shift measurement of the plurality of Doppler shift measurements.

* * * * *